United States Patent [19]
Lavarini et al.

[11] Patent Number: 4,862,100
[45] Date of Patent: * Aug. 29, 1989

[54] GAS LASER GENERATOR

[75] Inventors: Bernard Lavarini, Paris; Jean-Pierre Crancon, Arpajon; Jean-Yves Thomas, Paris, all of France

[73] Assignee: Compagnie Generale d'Electricite, Paris, France

[*] Notice: The portion of the term of this patent subsequent to Jun. 24, 1992 has been disclaimed.

[21] Appl. No.: 469,144

[22] Filed: May 9, 1984

[30] Foreign Application Priority Data

May 17, 1973 [FR] France ................ 73.17950

[51] Int. Cl.$^4$ .............................. H01S 3/00
[52] U.S. Cl. ............................. 330/4.3; 372/90
[58] Field of Search ............... 330/4.3; 331/94.5 G; 372/90

[56] References Cited

U.S. PATENT DOCUMENTS

| 3,566,297 | 2/1971 | Blackman, Jr. | 331/94.5 G |
| 3,571,747 | 3/1971 | Bronfin et al. | 331/94.5 G |
| 3,600,704 | 8/1971 | Banas et al. | 331/94.5 G |
| 3,668,550 | 6/1972 | Bullis et al. | 330/4.3 |
| 3,725,816 | 4/1973 | Mansell | 331/94.5 G |
| 3,760,294 | 9/1973 | Roberts et al. | 330/4.3 |
| 3,876,959 | 4/1975 | Biancardi et al. | 331/94.5 G |
| 3,891,944 | 6/1975 | Lavarini et al. | 330/4.3 |

Primary Examiner—Theodore M. Blum
Attorney, Agent, or Firm—Cushman, Darby & Cushman

[57] ABSTRACT

Gaseous flux laser generator of the nitrogen and carbon dioxyde type. The dimensions of the enclosure and the conditions of injection of the nitrogen and those of the electrical supply are chosen to set up a luminescent discharge in a swirling flow.

2 Claims, 2 Drawing Sheets

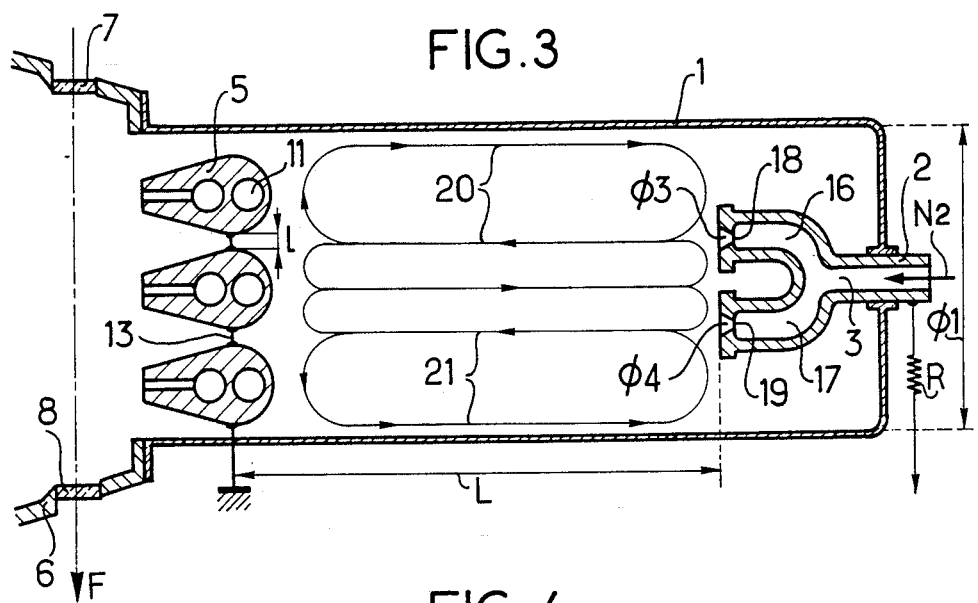
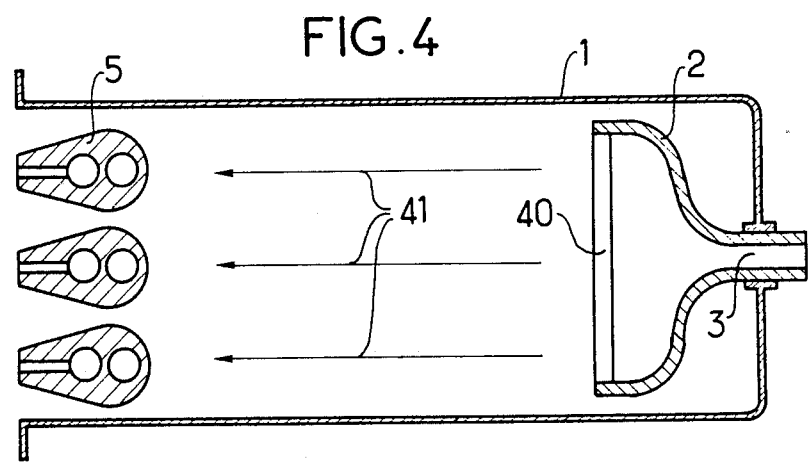
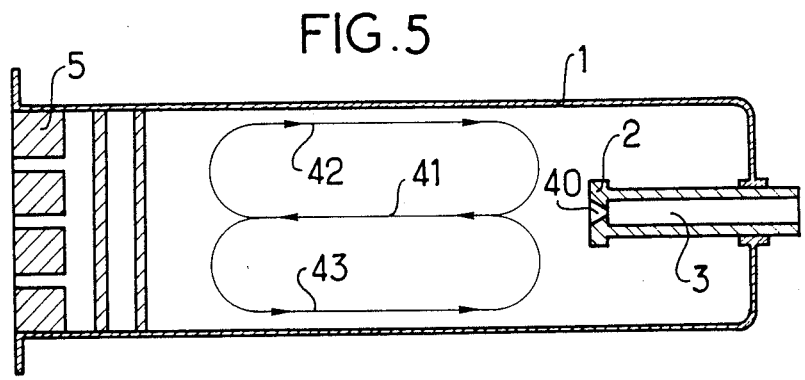

GAS LASER GENERATOR

The present addition concerns, like the parent U.S. Pat. No. 3,891,944, a gaseous flux laser generator. For convenience's sake, the word (invention) will be applied hereinafter to the characteristics taken as a whole described in these two texts.

For example, through a published document by Messrs. Lavarini, Dettini, Crancon, Michon, "Laser having electrical excitation and adiabatic release" (Reports to the Paris Academy of Sciences, vol. 272, p 335-338, Feb. 1, 1971, laser generators in which is produced an electrical discharge in a first gas (nitrogen) at a very high speed and that first gas is mixed with a second gas (carbon dioxide in an expansion chamber in which is arranged a resonant optical cavity are known. The electrical discharge has the effect of providing the nitrogen with an excitation energy which is transferred to the carbon dioxyde by molecular interaction during the mixing. The rapid movement of the mixture in the expansion chamber makes it reach the optical cavity before the de-excitation of the carbon dioxyde, this enabling the latter to have a stimulated light emission within the optical cavity, that is, a laser emission.

The nitrogen molecules have three possible modes of excitation: thermal, rotational and vibrational. The relaxation periods of the first two modes are very much shorter than the relaxation time of the last. When the nitrogen molecules and the carbon dioxyde molecules mix in the expansion chamber, it is the vibrational energy of the nitrogen exclusively which subsists and which produces, within the carbon dioxide, the inversion of population, which gives rise to a high-power laser pulse.

Such devices have, however, a certain number of disadvantages.

More particularly, the structure as well as the mutual arrangement of the elements constituting such generators does not make it possible to obtain powerful and homogeneous electrical discharges in the nitrogen, whencethere results a limiting of the power as well as of the efficiency of the laser emission.

The present invention makes it possible to overcome such disadvantages and it has for its object a gaseous flux laser generator making it possible to produce particularly powerful and homogenous electrical discharges and to obtain, due to that fact, high power laser emissions, such a generator having, moreover, a very great simplicity of structure combined with a moderate production cost.

The invention therefore concerns a gaseous flux laser generator comprising:

An elongated enclosure provided with transfer orifices at a first end;

Means for feeding the said enclosure with at least one jet of a first gas capable of being excited by an electrical discharge, these feeding means comprising an injection nozzle leading into the enclosure in the vicinity of its second end;

Electrodes arranged in the said enclosure and capable of setting up an electrical discharge in the said first gas;

An elongated expansion chamber into which leads the said enclosure through the said transfer orifices, the cross-section of the said expansion chamber progressively increasing starting from its first and adjacent to the said enclosure up to its second end;

Discharge means for keeping at a low pressure the said second end of the expansion chamber and making the said first gas circulate from the said injection nozzle up to the said second end of the expansion chamber through the said transfer orifices;

Means for feeding the said expansion chamber with at least a second gas, capable of being excited by molecular interaction with the said first gas in its excited state, these feed means being situated in the vicinity of the said enclosure so as to set up a mixture of the said first andsecond gases;

An optical resonnant cavity capable of setting up a laser emission in the presence of the said second gas in its excited state, that cavity being arranged in the said expansion chamber so as to have the said gas mixture flowing through it;

That generator being characterized in that the dimensions of the said enclosure, the diameter and the position of the said injection nozzle and the speed of injection of the said first gas, as well as the dimensions of the said transfer orifices are chosen so as to set up a turbulent flow of the said first gas in the volume of that enclosure, taken as a whole.

Other characteristics and advantages of the invention become apparent from the following description given by way of a purely illustrating example having no limiting character, with reference to the accompanying drawings in which:

FIGS. 1 and 3 show diagrammatically a cutaway view of a first and second embodiment of a generator according to the invention;

FIGS. 4 and 5 show diagrammatically a third embodiment of the generator according to the invention in a cutaway view through a horizontal plane and through a vertical plane, respectively. The elements which correspond to one another in the various figures are designated therein by the same reference numerals.

Figure 1:
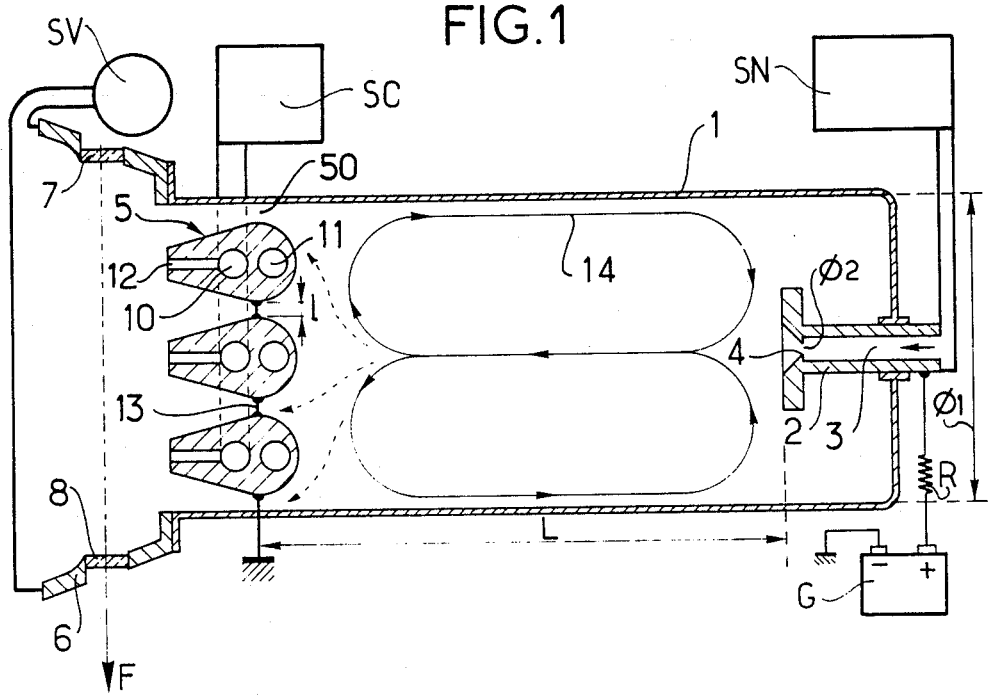

According to FIG. 1, a gaseous flux laser generator comprises a cyindrical enclosure 1 having a diameter of $\phi 1$ into which leads an injection nozzle 2 constituting an anode and connected to a voltage generator G through a resistor T. That nozzle 2 comprises an axial duct 3 connected to a nitrogen source under pressure, SN, shown diagrammatically. Its front face comprises an injection orifice 4, diverging towards the inside of the enclosure 1. At the other end of the enclosure 1 and at a distance L from the end of the nozzle 2 are arranged substantially at an equal distance from one another, injectors for carbon dioxyde 5 fed from a carbon dioxyde source SC and more particularly described with reference to FIG. 2, such injectors being connected electrically to the other pole of the voltage generator G by means of conductors 13.

The previously mentioned transfer orifices are constituted by the open gaps such as 50 between two injectors or between an injector and the wall of the enclosure 1.

The enclosure 1 leads by transfer orifices into an expansion chamber 6 provided with two mirrors 7 and 8 constituting an optical resonant cavity, the mirror 8 being semi-transparent and hence ensuring the laser emission in the direction of the arrow F.

The largest end of the expansion chamber is kept at very low pressure by discharge means constituted by ducts connecting it to a vacuum reserve SV, shown diagrammatically and having sufficient dimensions for the pressure to remain practically zero therein during the whole operation of the laser generator.

Figure 2:
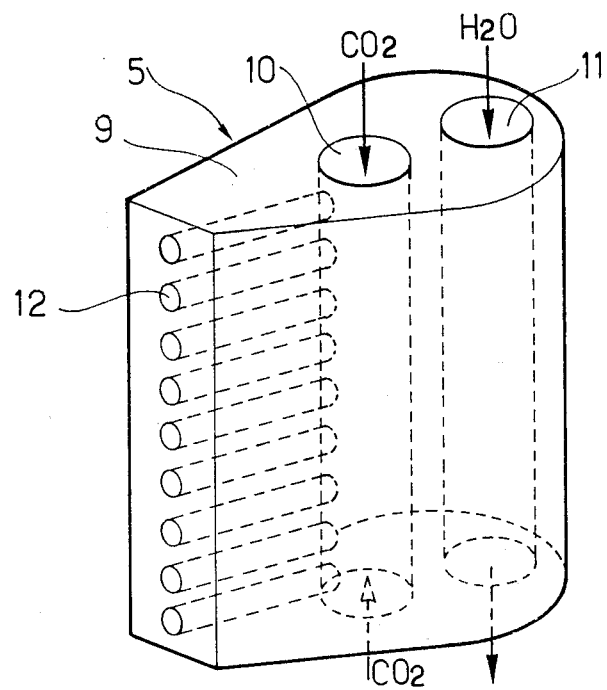
FIG. 2 shows a perspective view of an injector used in the generator according to the invention.

FIG. 2 enables the structure of the injectors 5, each comprising a profiled metallic body 9 in which has been formed, on the one hand, a duct 10 connected by its two ends, to a source of carbon dioxyde (CO2) and of helium and, on the other hand, a duct 11 in which a cooling fluid, in this case, water (H2O) flows. The said duct 10 feeds several tubes 12 having a constant cross-section for the injecting of the carbon dioxyde.

Such a generator operates as follows:

The nitrogen inserted under pressure in the axial passage 3 of the nozzle 2 is injected at supersonic speed in the enclosure 1 by means of the injection orifice 4. Subsequent to a suitable choice of the parameters of the generators such as L and $\phi 1$ previously defined, a swirling "main" flow of the nitrogen in the enclosure 1 is formed. That flow is shown by arrows in continuous lines 14. It ensures a homogenous distribution of the electrical discharge set off by feeding the anode 2 and the conductors 13 by means of the generator G.

A part of the nitrogen drawn away by the main flow then flows between the injectors 5 and the walls of the enclosure 1, forming a secondary flow shown by arrows in discontinuous lines and draws away the carbon dioxyde and the helium injected by the tubes 12. The carbon dioxyde is then excited in the way described previously and produces a laser emission in the direction of the arrow F.

According to the embodiment shown in FIG. 3, similar to FIG. 1, the passage 3 is subdivided into two passages 16 and 17 ending respectively in two injecting orifices 18 and 19, divergent towards the inside of the enclosure 1.

The structure and the operation of the generator are equivalent in the assembly to what has been set forth hereinabove inasmuch as concerns FIG. 1. Nevertheless, by means of a suitable choice of parameters, previously defined, a double swirling flow of the nitrogen takes place in the enclosure 1, this being shown by the arrows 20 and 21. This ensures a particularly homogenous distribution of the electrical discharge set off by feeding the anode 2 and the conductors 13 by means of the electrical generator (not shown in FIG. 3).

Of course, it will be understood easily that it is possible to implement a nozzle 2 comprising more than two injector orifices, as well as several nozzles 2 comprising one or several injector orifices.

The enclosure may, on the other hand, have a form other than cylindrical, parallelepipedical, for example. The nozzle 2 may then be formed in such a way as to inject in the enclosure 1, instead of a jet of nitrogen having a circular cross-section, a large and not very thick layer, parallel to one of the wells of the enclosure 1.

Such an embodiment is shown in FIGS. 4 and 5.

The nozzle 2 has an injection orifice 40 in the shape of a slot which is narrow in the vertical direction and having a width approximately equal to that of the enclosure 1 in the horizontal direction. The main flow of the nitrogen is then effected in horizontal layers: a middle layer shown by arrows 41 is directed from the nozzle 2 towards the injectors 5 and two layers, the one an upper layer and the other a lower layer, shown by arrows 42 and 43 respectively, are directed from the injectors 5 towards the nozzle 2.

In the embodiments which have just been described, the electrical discharge is longitudinal, that is, it is parallel to the direction of the average flow of the nitrogen in the enclosure 1. The present invention may nevertheless quite well be implemented if the discharge is transversal, that is, perpendicular to that same direction. It is necessary only for the greater part of the volume of the enclosure 1 to be crossed by the electrical discharge.

The way in which the various parameters of the generator according to the invention must be chosen to obtain proper operation will now be set forth more precisely.

One important aim is to obtain high energy efficiency, that is as high a ratio as possible between the light energy produced and the electrical energy consumed by the discharge in the enclosure 1. For that purpose, it is necessary for the discharge to be of the luminescent type. It is known that such a discharge is kept up by electrons which come essentially from the secondary electrnic emission of the cold cathode bombarded by ions or other particles, or, even, from an emission of the cold cathode by field effect. It is also known that it is easily distinguished from an electric arc in which a high rise in temperature appears with a high ionization of the gas and a great thermo-electronic emission at the cathode.

In a luminescent discharge, the speed of the electrons, within the positive column, is such that their kinetic energy is transferred with high efficiency, greater than 80%, to the nitrogen molecules encountered, with excitation of their vibrational mode.

In an electric arc, the high temperature reached makes the transfer efficiency small within the enclosure 1. Moreover, the energy efficiency of the processes which take place in the expansion chamber 6 is also reduced.

When it is sought to increase the power of known laser generators by increasing the volume of the enclosure 1, the pressure of the nitrogen and the density of the electric current in that enclosure, the homogeneous luminescent discharge becomes unstable and is transformed into a multiplicity of electric arcs in the form of filaments. The efficiency of these generators then decreases greatly. Due to the swirling flow according to the invention, the discharge remains of the luminescent and homogenous type, while enabling high power to be obtained.

For that purpose, in the case of FIGS. 1 and 2, that is, of a cylindrical enclosure and of a longitudinal electric discharge, it is necessary, firstly, to choose the ratio of the length L of the enclosure in relation to its diameter $\phi 1$ between approximately five and seven:

$$5 < L/\phi 1 < 7$$

It is ideal for the quantity of movement Qm injected per second by the nozzle 2, that is, the product of the output-to-weight ratio and the injection speed, be comprised between one and thirty, if the units adopted are the meter, the second and the kilogramme:

$$1 \text{ Kg.m/s}^2 < Qm < 30 \text{ Kg.m/s}^2$$

The output permeability coefficient K, that is, the ratio between the output surface left free between the injectors 5 and the surface of the cross-section of the enclosure, is, to great advantage, comprised between 5% and 50%.

$$5\% < K < 50\%$$

It should be observed, in this respect, that the pressure in the enclosure 1 is close to or greater than twice the pressure in the expansion chamber 6, so that the flow of the nitrogen between the injectors 5 reaches the speed of sound.

Inasmuch as concerns the pressure P of the nitrogen in the enclosure 1, the present invention is more especially and advantage if that pressure is greater than 0.1 bar. It may reach several bars without the appearance of an electric arc.

The injection speed V for the nitrogen through the nozzle 2 is greater than 100:

$$V > 100 \text{ m/s}$$

The current density j in the enclosure, that is, the ratio between the intensity and the surface of the cross-section of the enclosure, must be increased if it is required to increase the power of the generator. High current densities have been obtained before the present invention in enclosures having a small cross-section. A homogenous electrical discharge was then set up. Out of it was required to increase the power of the generator by increasing the cross-section of the enclosure, electric arcs in the form of filaments appeared. The present invention enables, when the current density is high, the cross-section of the enclosure 1 to be increased. The result obtained is, to great advantage:

$$10 \text{ mA/squ.cm} < j < 200 \text{ mA/squ.cm}$$

The electric energy Wm injected per unit of mass of the nitrogen may be expressed in joules per gramme:

$$500 \text{ J/g} < Wm < 5000 \text{ J/g}$$

It may be an advantage to calculate the ratio E/N between the electronic field E in the enclosure 1 and the number N of molecules of nitrogen per cubic centimeter, for that ratio is connected with the average speed of an electron striking a nitrogen molecule. The result then obtained is preferably:

$$10^{-17} \text{ V/squ.cm} \: E/N \: 10^{-14} \text{ V/squ.cm}$$

The values of the previously defined parameters will be given hereinbelow in two examples of the implementing of the invention, corresponding to the embodiment in FIG. 1.

| PARAMETER | UNIT | 1st EXAMPLE | 2nd EXAMPLE |
|---|---|---|---|
| L | mm | 300 | 300 |
| 0 1 | mm | 50 | 50 |
| Qm | Kgm/s2 | 3.5 | 17.5 |
| K | % | 10 | 15 |
| P | Millibar | 200 | 500 |
| V | m/s | 320 | 580 |
| j | mA/squ. cm | 20 | 60 |
| Wm | J/g | 690 | 1600 |

We claim:

1. A gaseous flux laser generator comprising:
an elongated enclosure, a plurality of equally, laterally spaced, transversely aligned, aerodynamically profiled gas injectors positioned within said enclosure adjacent a first end thereof and forming transfer openings at said first end with said enclosure, an injection nozzle opening into said enclosure close to its second end for supplying said enclosure with at least one jet of a first gas capable of being excited by an electric discharge;
longitudinally spaced electrodes disposed in the container at respective ends for producing an electrical discharge in the first gas, an elongated expansion chamber leading from said enclosure at the first end with the cross-section of said expansion chamber progressively increasing from its first end adjacent to said enclosure towards its second end;
evacuation means for maintaining the second end of the expansion chamber at a low pressure and for circulating the first gas from the injection nozzle through said elongated enclosure and into the elongated expansion chamber through openings between said gas injector, said profiled gas injectors including gas discharge nozzles facing into the expansion chamber and being supplied with at least one second gas capable of being excited by molecular interaction with the first gas in its excited state, and being situated in the vicinity of the enclosure so as to set up a mixture of said first and second gases, an optical resonant cavity capable of setting up a laser emission in the presence of said second gas in its excited state, that cavity being arranged in said expansion chamber in such a manner as to be traversed by the gaseous mixture downstream of said gas discharge nozzles;
said generator being characterized in that said enclosure comprises a cylinder having a circular cross-section whose length comprises between five and seven times its diameter, an wherein the dimensions of said enclosure, the diameter and position of said injection nozzle, the speed of injection of said first gas, the dimensions of the gas passages between said profiled gas injectors and the arrangement of the injection nozzle along the axis of the cylinder are such that a whirling movement of the first gas is produced longitudinally throughout said container, upstream of said injector nozzles with a first, interflow portion extending longitudinally from the second end to the first end, between said electrodes, and at least one second flow portion is produced radially outwards of the first flow portion, reverse thereto and near the side wall of said cylinder.

2. The generator according to claim 1, wherein an electric source and said electrodes are arranged so as to set up a luminescent discharge in said first gas.

* * * * *